(12) United States Patent
Ku et al.

(10) Patent No.: US 8,362,714 B2
(45) Date of Patent: Jan. 29, 2013

(54) LED ILLUMINATION SYSTEM WITH A POWER SAVING FEATURE

(75) Inventors: Chin-Long Ku, Taipei Hsien (TW); Da-Peng Zhang, Shenzhen (CN)

(73) Assignees: Fu Zhun Precision Industry (Shen Zhen) Co., Ltd., Shenzhen (CN); Foxconn Technology Co., Ltd., New Taipei (TW)

( * ) Notice: Subject to any disclaimer, the term of this patent is extended or adjusted under 35 U.S.C. 154(b) by 286 days.

(21) Appl. No.: 12/696,000

(22) Filed: Jan. 28, 2010

(65) Prior Publication Data

US 2011/0127929 A1  Jun. 2, 2011

(30) Foreign Application Priority Data

Nov. 27, 2009  (CN) .......................... 2009 1 0310582

(51) Int. Cl.
*H05B 37/02* (2006.01)
*G05F 1/00* (2006.01)
(52) U.S. Cl. ........................................ 315/307; 315/291
(58) Field of Classification Search .................. 315/291, 315/307, 308, 224, 360
See application file for complete search history.

(56) References Cited

U.S. PATENT DOCUMENTS

| | | | | |
|---|---|---|---|---|
| 6,777,891 | B2 * | 8/2004 | Lys et al. | 315/291 |
| 7,049,752 | B2 * | 5/2006 | Tani et al. | 315/169.1 |
| 2002/0145041 | A1 * | 10/2002 | Muthu et al. | 235/454 |
| 2007/0159421 | A1 * | 7/2007 | Peker et al. | 345/82 |
| 2008/0088571 | A1 * | 4/2008 | Lee et al. | 345/102 |
| 2009/0021955 | A1 * | 1/2009 | Kuang et al. | 362/479 |
| 2011/0140637 | A1 * | 6/2011 | Ku et al. | 315/307 |

* cited by examiner

*Primary Examiner* — Minh D A
(74) *Attorney, Agent, or Firm* — Altis Law Group, Inc.

(57) ABSTRACT

An LED illumination system includes a control circuit having a timing unit, a control unit and a PWM signal generating unit. The timing unit divides an operating period of an LED lamp into a plurality of time segments, and outputs a clock signal at a start of each time segment to the control unit. The control unit outputs different controlling signals corresponding to the clock signals to the PWM signal generating unit, which in turn generates different PWM signals with different duty cycles. A constant current circuit electrically connects the control circuit to the LED lamp. The constant current circuit outputs different electric currents to the LED lamp according to the PWM signals, to thereby control the LED lamp to emit light having different light intensities at the various time segments of the operating period.

9 Claims, 4 Drawing Sheets

LED ILLUMINATION SYSTEM WITH A POWER SAVING FEATURE

BACKGROUND

1. Technical Field

The present disclosure relates to LED (light emitting diode) illumination systems, and more particularly to an LED illumination system having a low energy consumption.

2. Description of Related Art

LEDs have been available since the early 1960s. Compared with the conventional light sources, such as fluorescent lamp, halogen lamp and incandescent lamp, the LEDs have a higher electro-optical conversion efficiency. Thus, nowadays LED usage has been increased in popularity in various applications, particularly, the applications needing large power consumption, in order to reduce operation cost of these applications.

Road lamp is one type of lamps consuming a larger amount of power; thus, it is extremely desirable to replace the conventional road lamps with the LED road lamps. However, the LED road lamp always keeps a constant brightness all over the illumination period thereof, even in the late night. In fact, at the late night, a traffic flow is low, and thus there is no need to provide such a high intensity as that at early night. The LED lamp would still waste a large amount of power to maintain the constant brightness during its whole operation period.

It is thus desirable to provide an LED illumination system which can overcome the described limitations.

DETAILED DESCRIPTION

Figure 1:
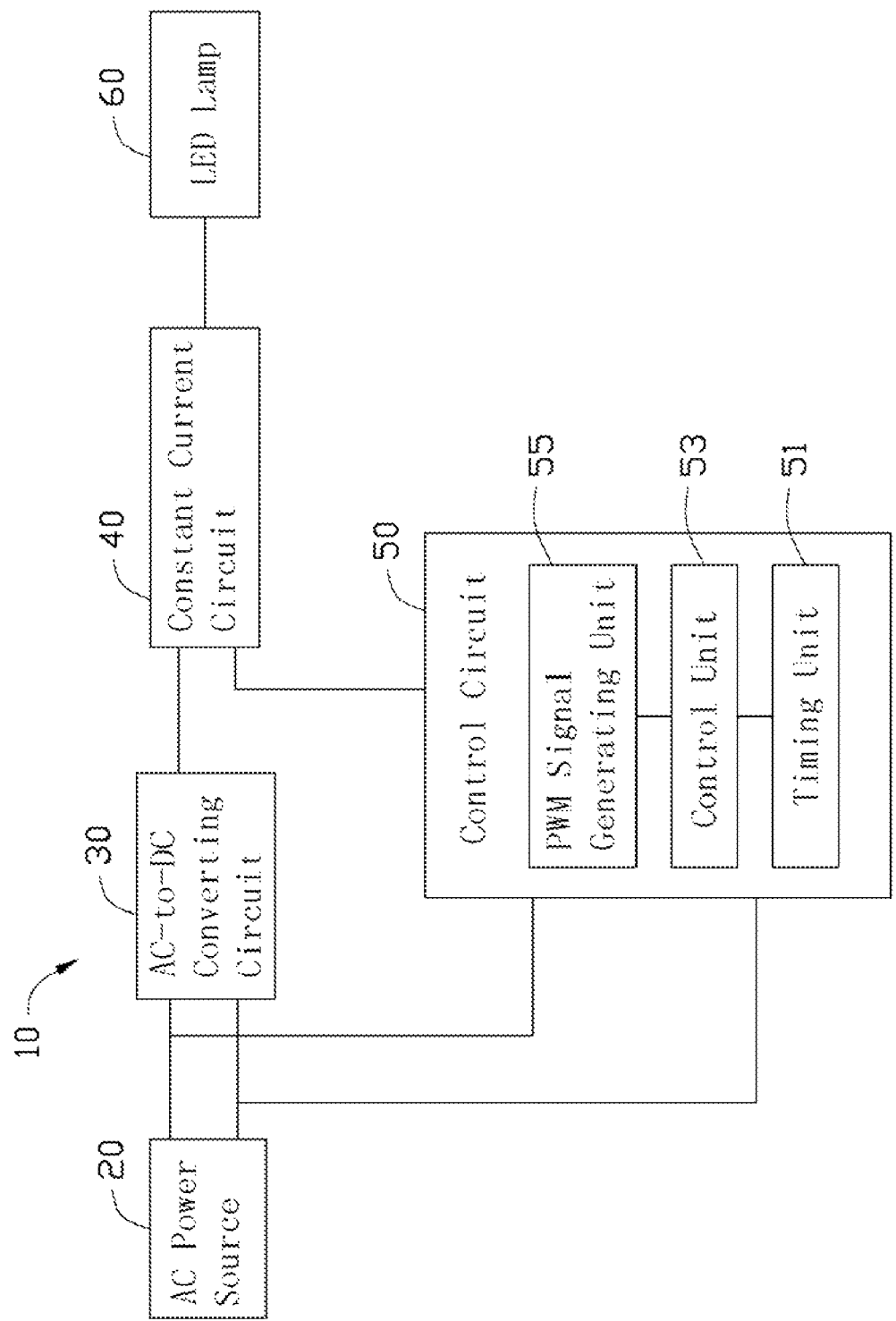
FIG. 1 is a block diagram illustrating an LED illumination system according to an embodiment of the present disclosure.

Reference will now be made to the drawing figures to describe the present LED illumination system in detail.

Referring to FIG. 1, an LED illumination system 10 according to an embodiment includes an AC power source 20, an AC-to-DC converting circuit 30, a constant current circuit 40, a control circuit 50 and an LED lamp 60. The control circuit 50 of the LED illumination system 10 is provided for controlling a brightness of a light emitting diode (LED) lamp 60 at different periods of time of use. In this embodiment, the LED lamp 60 is used as a road lamp. Alternatively, the LED lamp 60 can be used in other applications such as park lamp or in a place which needs illumination during the whole night. The LED lamp 60 is electrically connected to the constant current circuit 40.

The AC-to-DC converting circuit 30 of the LED illumination system 10 has an input end electrically connected to the AC power source 20 and an output end electrically connected to the constant current circuit 40. The AC-to-DC converting circuit 30 receives an AC power from the AC power source 20, then converts the AC power to a DC power and finally outputs the DC power to the constant current circuit 40. The constant current circuit 40 includes a constant current source driving chip which can receive external PWM signals and supplies different constant electric currents to the LED lamp 60 according to the PWM signals.

The control circuit 50 includes a timing unit 51, a control unit 53 and a PWM signal generating unit 55. The timing unit 51 is set to output clock signals to the control unit 53 at predetermined times during an operation of the LED lamp 60, thereby adjusting the brightness of the LED lamp 60 in different periods. In this embodiment, the timing unit 51 is timer. The timing unit 51 takes an operating period of the LED lamp 60 of one day as a cycle, and divides the cycle into a plurality of time segments. The timing unit 51 is electrically connected with the AC power source 20. When used, the timing unit 51 starts to count the operating time of the LED lamp 60 immediately after the LED lamp 60 is turned on, and outputs a clock signal at a start of each of the time segments to the control unit 53. The control unit 53 is electrically connected with the PWM signal generating unit 55. The control unit 53 receives the clock signal from the timing unit 51 and outputs a control signal corresponding to the clock signal to the PWM signal generating unit 55, thereby controlling the PWM signal generating unit 55 to output a PWM signal which has a duty cycle corresponding to the control signal to the constant current circuit 40. In this embodiment, the control unit 53 is a central process unit (CPU) chip.

Alternatively, the control circuit 50 can be a micro-programmed control unit (MCU) which sets a program therein for simultaneously functioning as the timing unit 51, the control unit 53 and the PWM signal generating unit 55 described above.

Figure 2:
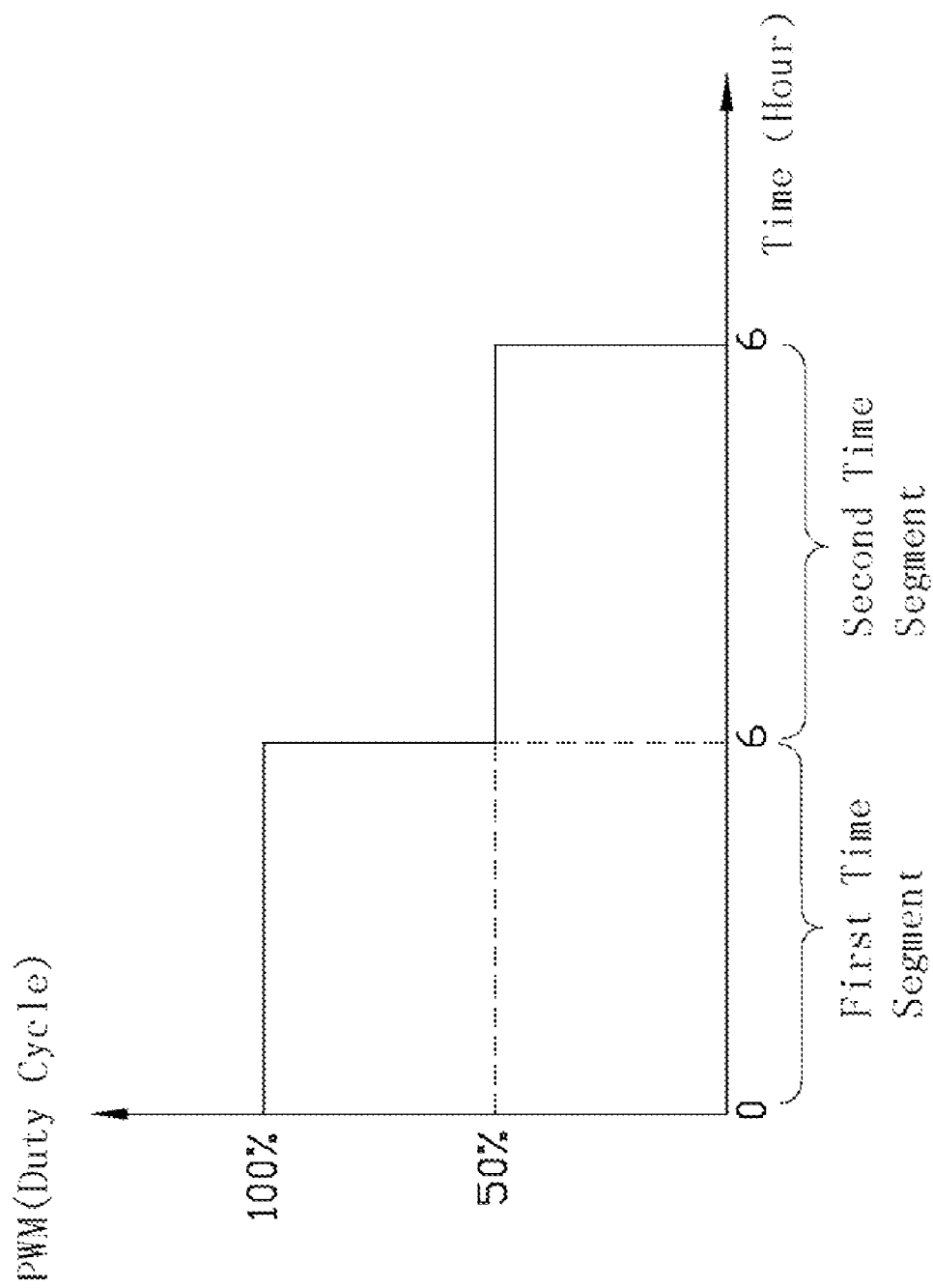
FIG. 2 is a diagram showing a multi-segments control curve achievable by the LED illumination system of FIG. 1 for controlling an LED lamp to illuminate with different brightness at different time segments according to a first operation mode.

Supposing the LED lamp 60 needs to be continuously used for twelve hours in one cycle, i.e., from 18:00 of the present day to 06:00 of the next day. The brightness of the LED lamp 60 at different times during the cycle is shown in FIG. 2: the timing unit 51 divides the cycle into a first time segment and a second time segment, and each of the first and second time segments is six hours. The first time segment is between 18:00~24:00. The second time segment is between 00:00~06:00. A traffic flow on the road during the first time segment is higher than that during the second time segment. In FIG. 2, the latitudinal axis shows the time segments during one cycle, and the longitudinal axis shows the duty cycle of the PWM signal which is outputted by the PWM signal generating unit 55 to the constant current circuit 40 during the cycle. When the LED lamp 60 is turned on at 18:00, the timing unit 51 starts to count the operating time of the LED lamp 60 from zero and outputs a first clock signal to the control unit 53, and the PWM signal generating unit 55 receives a first control signal from the control unit 53 and starts to output a first PWM signal which has a duty cycle of 100% to the constant current circuit 40. During the first time segment, the PWM signal generating unit 55 continuously outputs the first PWM signal to the constant current circuit 40. Thus the constant current circuit 40 supplies a large electric current to the LED lamp 60 for driving the LED lamp 60 emits with full brightness.

When the first time segment draws to an end, the second time segment starts. It's now 24:00 in the late night, and at this moment, a second clock signal is outputted by the timing unit 51 to the control unit 53, and the timing unit 51 counts from zero again. The control unit 53 receives the second clock signal, and supplies a second control signal to the PWM signal generating unit 55. When the PWM signal generating unit 55 receives the second control signal from the control unit 53, the PWM signal generating unit 55 changes to output a second PWM signal which has a duty cycle of 50% to the constant current circuit 40. The PWM signal generating unit 55 continuously outputs the second PWM signal to the constant current circuit 40 until the second time segment is expired. Accordingly, during the second time segment, the constant current circuit 40 supplies a small electric current which is about a half of the large electric current during the first time segment, and the brightness of the LED lamp 60 decreases to about a half of the brightness during the first time segment. When the second time segment draws to an end, it's 06:00 in the next morning. At this moment, the LED lamp 60 is turned off. The LED lamp 60 maintains turn off between 06:00~18:00 since sunshine is presented and no lamp illumination is needed during this period.

Figure 3:
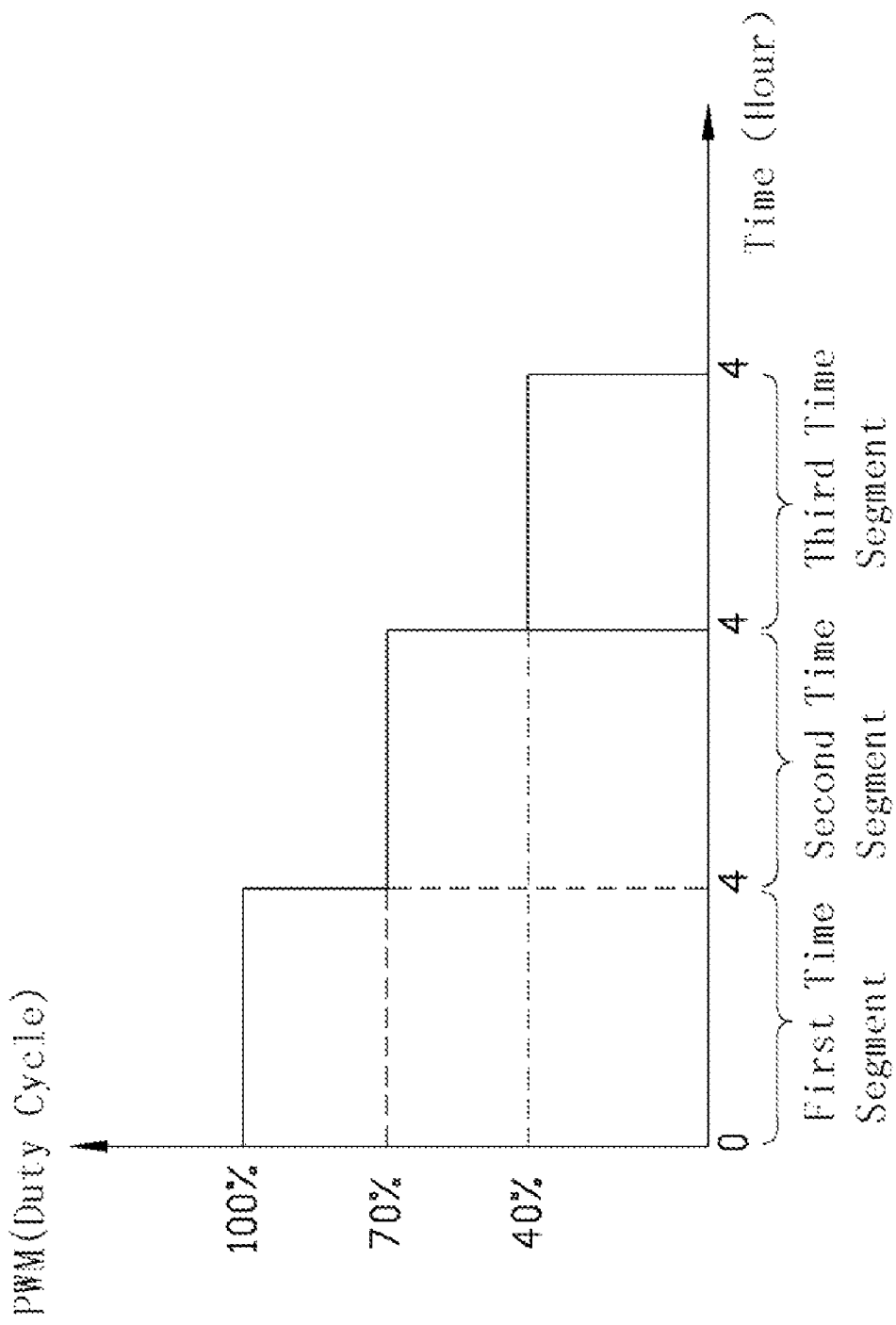
FIG. 3 is similar to FIG. 2, showing the LED lamp illuminating with different brightness at different segments according to a second operation mode.
Figure 4:
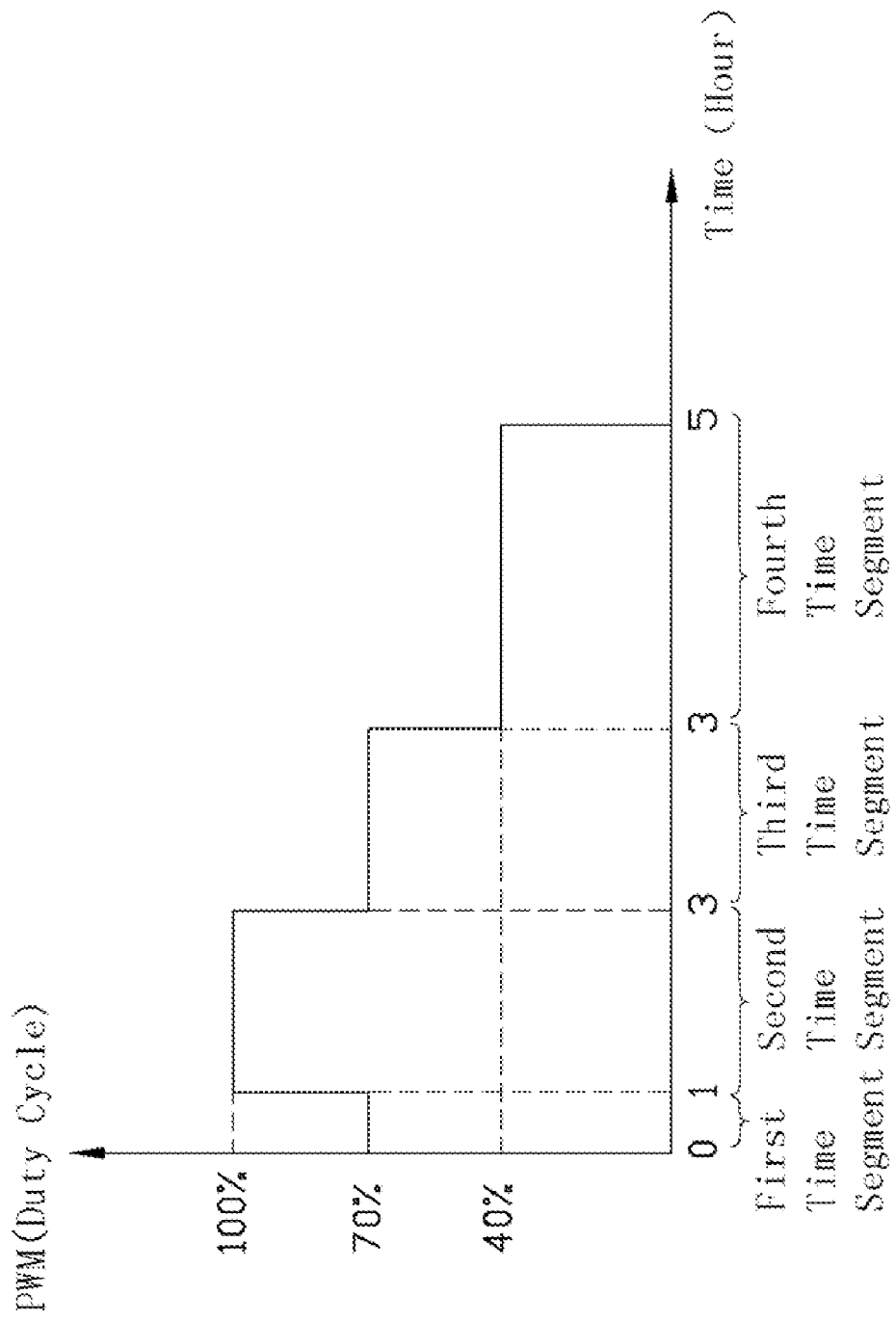
FIG. 4 is similar to FIG. 2, showing the LED lamp illuminating with different brightness at different time segments according to a third operation mode.

Such multi-segments control curve shown in FIG. 2 can satisfy the illumination demands of a subordinate street or road; however, for a main road or street where a traffic flow is still high even at the late night, some changes should be made to the multi-segments control curve. Another example of a multi-segments control curve for controlling the LED lamp 60 to illuminate with different brightness at different times is shown in FIG. 3: the time unit 51 divides the cycle into three equivalent time segments, i.e., a first time segment, a second time segment and a third time segment, and each of the time segments is four hours. The first time segment is between 18:00~22:00 when an amount of a traffic flow is high. The second time segment is between 22:00~02:00 when the amount of the traffic flow is relatively low. The third time segment is between 02:00~06:00 when the amount of the traffic flow is the lowest.

When the LED lamp 60 is turned on at 18:00, the timing unit 51 starts to count the operation time of the LED lamp 60 from zero and output a first clock signal to the control unit 53, and the PWM signal generating unit 55 receives a first control signal from the control unit 53 and starts to output a first PWM signal which has 100% duty cycle to the constant current circuit 40. The PWM signal generating unit 55 continuously supplies the first PWM signal to the constant current circuit 40. Therefore, during the first time segment, the constant current circuit 40 supplies a large electric current to the LED lamp 60 for driving the LED lamp 60 to emit with full brightness.

When the timing unit 51 counts to four hours, the first time segment draws to an end, and the second time segment is start. It's 22:00 in the late night, at this moment, a second clock signal is outputted by the timing unit 51 to the control unit 53, and the timing unit 51 counts from zero for a second time. Simultaneously, the control unit 53 receives the second clock signal from the timing unit 51, and outputs a second control signal according to the second clock signal to the PWM signal generating unit 55, to thereby control the PWM signal generating unit 55 to output a second PWM signal which has 70% duty cycle corresponding to the second control signal to the constant current circuit 40. Accordingly, during the second time segment, the constant current circuit 40 changes to continuously supply a small electric current which is about 70% of the large electric current during the first time segment according to the second PWM signal to the LED lamp 60, and the brightness decreases to about 70% of the brightness during the first time segment.

When the timing unit 51 counts to four hours again, the second time segment draws to an end, and the third time segment is start. It's 02:00 in early morning, at this moment, a third clock signal is outputted by the timing unit 51 to the control unit 53, and the timing unit 51 counts from zero for a third time. Accordingly, the control unit 53 outputs a third control signal corresponding to the third clock signal to the PWM signal generating unit 55, to thereby control the PWM signal generating unit 55 to output a third PWM signal which has 40% duty cycle corresponding to the third control signal to the constant current circuit 40. Thus, during the third period, the constant current circuit 40 changes to supply another electric current which is about 40% of the large electric current during the first time segment to the LED lamp 60, and the brightness decreases to about 40% thereof according to the another electric current outputted by the constant current circuit 40. When the third time segment draws to an end, it's 06:00 in the next morning. Thus the LED lamp 60 is turned off since no lamp illumination is needed during the daytime.

Alternatively, time period of each time segment of the multi-segments control curve predetermined by the control circuit 50 can be different from each other. A third example of a multi-segments control curve for controlling the LED lamp 60 to illuminate with different brightness at unequal time segments is shown in FIG. 3: the time unit 51 divides the cycle into four time segments. A first time segment is between 18:00~19:00 when the amount of a traffic flow is high and it's not totally dark outside. A second time segment is between 19:00~22:00 when the amount of the traffic flow is still high and it's already totally dark outside. A third time segment is between 22:00~01:00 when the amount of the traffic flow is relatively low. A fourth time segment is between 01:00~6:00 when the amount of the traffic flow is the lowest.

When used, the timing unit 51 starts to count the operating time of the LED lamp 60 immediately after the LED lamp 60 is turned on, and the PWM signal generating unit 55 starts to output a PWM signal which has 70% duty cycle to the constant current circuit 40. During the first time segment, the PWM signal generating unit 55 continuously supplies the PWM signal having 70% duty cycle to the constant current circuit for driving the LED lamp 60 emits with an initial brightness lower than full brightness. When the timing unit 51 counts to one hour, the first time segment draws to an end, and the timing unit 51 starts to output a second clock signal to the control unit 53. The control unit 53 receives the second clock signal and outputs a second control signal corresponding to the second clock signal to the PWM signal generating unit 55 to thereby control the PWM signal generating unit 55 to output a PWM signal which has 100% duty cycle to the constant current circuit 40. During the second time segment, the PWM signal generating unit continuously supplies the PWM signal which has 100% duty cycle to the constant current circuit for driving the LED lamp 60 emits with full brightness.

When the second time segment draws to an end, the timing unit 51 counts from zero again and the third time segment is start. Similarly, a third clock signal is outputted by the timing unit 51 to the control unit 53 at the end of the second time segment. The control unit 53 receives the third clock signal and outputs a third control signal corresponding to the third clock signal to the PWM signal generating unit 55. Then the PWM signal generating unit 55 outputs the PWM signal which has 70% duty cycle corresponding to the third control signal to the constant current circuit 40 again. Next, when the third time segment draws to an end, a fourth clock signal is outputted by the timing unit 51 to the control unit 53, the timing unit 51 counts from zero for a fourth time and the fourth time segment is start. The control unit 53 outputs a fourth control signal corresponding to the fourth clock signal to the PWM signal generating unit 55 to control the PWM signal generating unit 55 to output a PWM signal which has 40% duty cycle to the constant current circuit 40. When the fourth time segment is expired, the LED lamp 60 is turned off. Accordingly, the LED lamp 60 illuminates with different brightness at the different segments during operation under by control of the control circuit 50.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED illumination system for emitting light with different light intensities at different times comprising:
   an LED lamp for illuminating an object;
   a control circuit comprising a timing unit, a control unit and a PWM signal generating unit, the timing unit dividing an operating period of the LED lamp into a plurality of time segments each being no less than one hour, and outputting a clock signal at a start of each of the time segments to the control unit, the control unit outputting different controlling signals corresponding to the clock signals to the PWM signal generating unit to cause the PWM signal generating unit to output different PWM signals which have different duty cycles at different time segments; and
   a constant current circuit electrically connecting the control circuit to the LED lamp, the constant current circuit outputting different electric currents to the LED lamp according to the PWM signals, to thereby control the LED lamp to emit light having different light intensities at the various time segments of the operating period.

2. The LED illumination system of claim 1, wherein the timing unit is a timer.

3. The LED illumination system of claim 1, wherein the control unit is a central process unit.

4. The LED illumination system of claim 1, wherein the control circuit comprises a micro-programmed control unit which sets a program therein for simultaneously functioning as the timing unit, the control unit and the PWM signal generating unit.

5. The LED illumination system of claim 1, wherein the PWM signal generating unit continuously outputs a first PWM signal having a first duty cycle during one of the time segments and a second PWM signal having a second duty cycle during a next time segment of the operating period, the first duty cycle being larger than the second duty cycle.

6. The LED illumination system of claim 1, wherein time periods of the time segments are equivalent to each other.

7. The LED illumination system of claim 1, wherein time periods of the time segments are different from each other.

8. The LED illumination system of claim 1, wherein the LED lamp is a road lamp.

9. The LED illumination system of claim 1, further comprising an AC power source in electrical connection with the control circuit, and an AC-to-DC converting circuit electrically connected between the constant current circuit and the AC power source.

* * * * *